Figure 1:
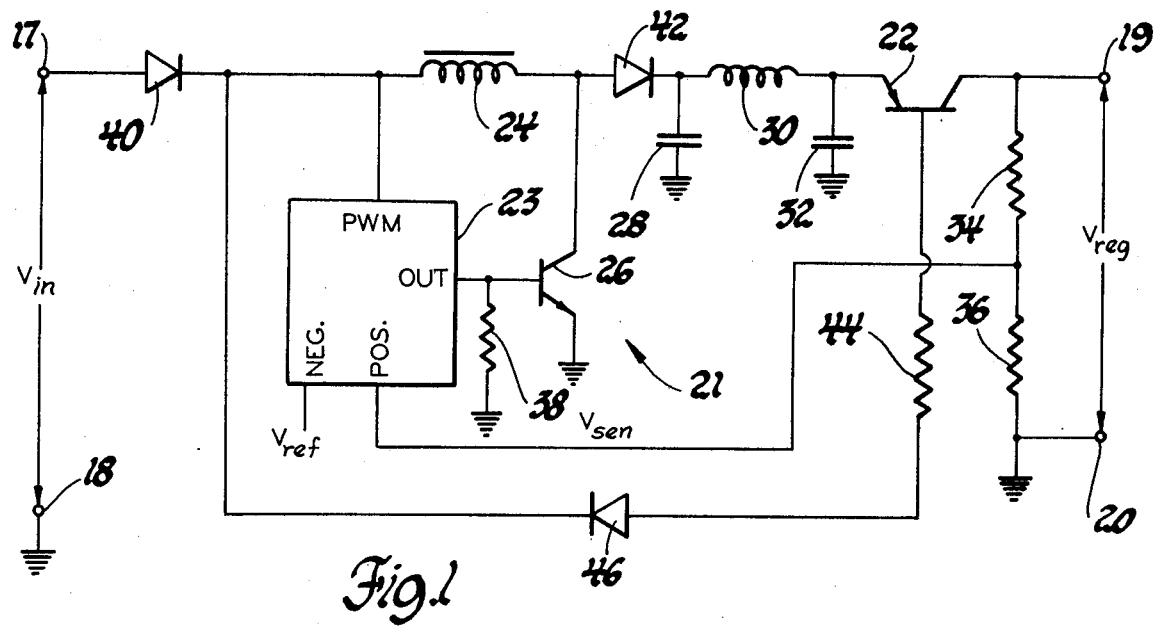

United States Patent [19]

McWhorter

[11] Patent Number: 4,459,537
[45] Date of Patent: Jul. 10, 1984

[54] UP-DOWN VOLTAGE REGULATOR
[75] Inventor: Bill R. McWhorter, Kokomo, Ind.
[73] Assignee: General Motors Corporation, Detroit, Mich.
[21] Appl. No.: 443,384
[22] Filed: Nov. 22, 1982
[51] Int. Cl.³ .............................................. G05F 1/56
[52] U.S. Cl. .................................... 323/224; 323/266; 323/303
[58] Field of Search ....................... 323/222, 224–226, 323/299, 303, 266, 268, 282

[56] References Cited

U.S. PATENT DOCUMENTS

| | | | |
|---|---|---|---|
| 3,600,667 | 8/1971 | Wynn | 307/242 X |
| 3,886,438 | 5/1975 | Bouman | 323/303 X |
| 4,347,474 | 8/1982 | Brooks et al. | 323/224 |

FOREIGN PATENT DOCUMENTS

| | | | |
|---|---|---|---|
| 0396680 | 12/1973 | U.S.S.R. | 323/303 |
| 0444172 | 4/1975 | U.S.S.R. | 323/222 |
| 0691819 | 10/1979 | U.S.S.R. | 323/222 |

OTHER PUBLICATIONS

M. Grossoni, "Transistorized Low-Power Power Plant for Telecommunication Systems", Conference: Intelec. '81, Third International Telecommunication Energy Conference, London, England, (19–21, May 1981), pp. 282–287.

Primary Examiner—Peter S. Wong
Attorney, Agent, or Firm—Howard N. Conkey

[57] ABSTRACT

An up-down voltage regulator includes an up regulator followed by a series pass PNP transistor. The base of the PNP transistor is coupled to an unregulated voltage source. The up regulator is responsive to the voltage at the collector of the PNP transistor to control the emitter voltage of the PNP transistor for all values of the unregulated voltage source to bias the PNP transistor so as to establish and maintain the collector voltage of the PNP transistor at a desired regulated value.

3 Claims, 2 Drawing Figures

UP-DOWN VOLTAGE REGULATOR

This invention relates to a voltage regulator and more specifically to an up-down voltage regulator for applying a desired regulated DC voltage across a pair of output terminals from a DC voltage source having a source voltage varying above and below the desired regulated voltage.

Up-down regulators for providing a regulated voltage from a source voltage varying above and below the desired regulated voltage are known. Typically, these regulators include a down or dissipative type regulator followed by an up switching regulator. In this type of regulator, all of the switching current of the up regulator must pass through the down regulator which generally takes the form of a series pass transistor. This requires the series pass transistor to have a large emitter area to accommodate the high current levels. Further, the circuit for controlling the two regulators is substantially complex due to the difficult nature in the control of the up regulator when following a pre-regulator such as the dissipative type down regulator.

It is the general object of this invention to provide for an improved up-down voltage regulator.

It is another object of this invention to provide for an up-down voltage regulator employing a dissipative series pass transistor element having small emitter area requirements.

It is another object of this invention to provide for an up-down voltage regulator having improved efficiency.

It is another object of this invention to provide for an up-down voltage regulator operable at all values of the regulator supply voltage to control the bias of a series pass transistor to provide for a desired regulated voltage.

It is another object of this invention to provide for an up-down switching regulator employing an up regulator followed by a series pass transistor in which the up regulator is responsive to the output voltage to bias the series pass transistor for all values of the input voltage so as to provide a desired regulated output voltage.

Figure 2:
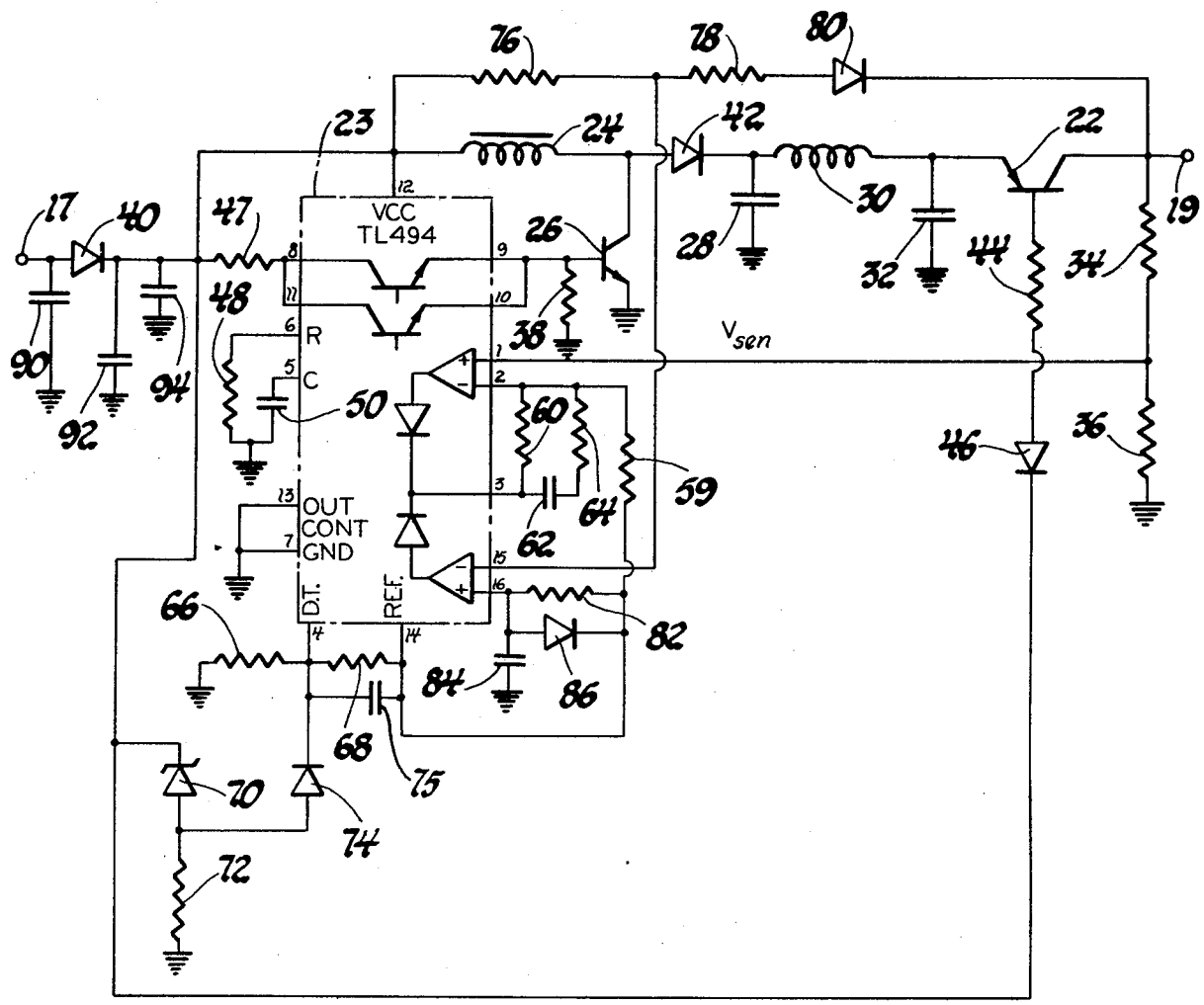

These and other objects of this invention may be best understood by reference to the following description of a preferred embodiment of the invention and the drawings in which:

FIG. 1 is a simplified circuit diagram illustrating the principles of this invention, and FIG. 2 is a detailed schematic diagram of an up-down voltage regulator employing the principles of this invention.

Referring to FIG. 1, there is illustrated in general form an up-down voltage regulator that is responsive to an unregulated voltage $V_{in}$ from a voltage source (not shown) applied across a positive input voltage terminal 17 and a grounded input terminal 18 for supplying a predetermined regulated voltage $V_{reg}$ across an output load terminal 19 and a grounded reference terminal 20. In general, the voltage regulator includes a voltage multiplier in the form of an up regulator 21 coupled with the unregulated input voltage terminal 17 followed by a dissipative or variable impedance element in the form of a PNP series pass transistor 22 coupled with the load terminal 19.

The up regulator 21 is basically comprised of a pulse width modulator 23, an inductor 24, an NPN transistor 26 controlled by the pulse width modulator 23 to periodically charge the inductor 24, a capacitor 28 that is charged by the inductor 24, and a filter comprised of an inductor 30 and a capacitor 32. The output of the up regulator 21 appears across the filter capacitor 32.

The pulse width modulator 23 generates voltage pulses at a predetermined frequency with each pulse having a width establishing a particular duty cycle determined by the amount the voltage at its positive input is below the voltage at its negative input. A sense voltage $V_{sen}$ that is a measure of the voltage $V_{reg}$ across the load and reference terminals 19 and 20 is provided to the positive input of the pulse width modulator 23 by a voltage divider formed by a pair of resistors 34 and 36 coupled across the terminals 19 and 20. A reference voltage $V_{ref}$ that is equal to $V_{sen}$ when $V_{reg}$ is at the desired value is provided to the negative input of the pulse width modulator 23. The width of the voltage pulse provided by the pulse width modulator 23 has a minimum value when $V_{sen}$ is equal to or greater than $V_{ref}$ and increases as $V_{sen}$ decreases below $V_{ref}$.

The pulse width modulated signal output of the pulse width modulator 23 is developed across a biasing resistor 38 coupled between the base and emitter of the transistor 26. The transistor 26, when energized, couples the inductor 24 across the unregulated voltage source at the terminals 17 and 18 through a blocking diode 40. When so coupled, the inductor 24 is charged with current to a level determined by the pulse width of the signal from the pulse width modulator 23. When the transistor 26 is biased nonconductive, the inductor 24 discharges through a diode 42, the capacitor 28, the unregulated voltage source and the diode 40. This current discharge through the capacitor 28 charges the capacitor 28 to a voltage dependent upon the current level established in the inductor 24 when the transistor 26 was conducting. The voltage across the capacitor 28 is filtered by the filter comprised of he inductor 30 and the capacitor 32 with the voltage across the capacitor 32 comprising the output of the voltage multiplier formed by the switching up regulator 21. This voltage, hereinafter referred to as an intermediate voltage in the up-down regulator of FIG. 1, is applied to the emitter of the series pass transistor 22.

The base electrode of the series pass PNP transistor 22 is coupled to the positive supply voltage terminal 17 via a feed forward loop comprised of a resistor 44, a blocking diode 46 and the diode 40. With this feed forward connection, it can be seen that the series pass PNP transistor 22 cannot be biased conductive unless the intermediate voltage applied to its emitter is greater than the unregulated source voltage $V_{in}$ applied to the terminal 17 by at least the emitter-base junction voltage of the transistor 22. As will be described, for all values of $V_{in}$, the up regulator 21 responds to the sense voltage $V_{sen}$ representing the output regulated voltage $V_{reg}$ and multiplies $V_{in}$ by an amount which biases the transistor 22 to the conduction level which maintains $V_{reg}$ across the output terminals 19 and 20 at the desired regulated voltage value.

In operation, when $V_{reg}$ decreases below the desired regulated voltage value, $V_{sen}$ fed back to the pulse width modulator 23 becomes less than the reference voltage $V_{ref}$ resulting in an increase in the pulse width (or duty cycle) of the signal applied to the transistor 26. This results in an increase in the level of the current charge of the inductor 24 when the transistor 26 is biased on. When the transistor 26 is then biased off, the discharge of the inductor 24 charges the capacitor 28 to a higher level resulting in an increase in the filtered intermediate voltage applied to the emitter of the transistor 22. This increased voltage biases the transistor 22 more conductive to increase $V_{reg}$ to the desired regulated voltage value.

Conversely, if $V_{reg}$ increases above the desired value, the pulse width of the output from the pulse width modulator 23 decreases to decrease the intermediate voltage at the emitter of the transistor 22 which is biased less conductive to decrease $V_{reg}$ to the desired regulated voltage value.

The foregoing response to the sense voltage $V_{sen}$ to maintain the regulated output voltage $V_{reg}$ applies for all values of the unregulated input voltage $V_{in}$ above and below the desired regulated voltage value. When the unregulated input voltage $V_{in}$ is less than the desired regulated voltage, the series pass PNP transistor 22 is biased into saturation by the input voltage applied to its base electrode and the intermediate voltage applied to its emitter electrode by the up regulator 21 so that the up-down regulator of FIG. 1 operates essentially as an up regulator. During this input voltage condition, $V_{in}$ is multiplied by the up regulator 21 to an intermediate voltage substantially equal to the desired regulated voltage. Conversely, when the unregulated input voltage increases above the desired regulated voltage, $V_{in}$ is multiplied to an intermediate voltage level above $V_{in}$ that biases the transistor 22 in its linear operating region to establish an impedance to reduce the intermediate voltage to the desired regulated voltage. During this condition, the up-down regulator of FIG. 1 operates essentially as a dissipative down regulator to establish the desired regulated voltage.

Referring to FIG. 2, there is illustrated a detailed schematic diagram of the up-down regulator including protection circuitry. The elements of FIG. 2 that are common to those of FIG. 1 have been given the same numerical identification.

The pulse width modulator 23 takes the form of an integrated circuit which may be, for example, a 16 pin integrated circuit switching voltage regulator type TL 494 manufactured by Texas Instruments. In this circuit, the source voltage $V_{in}$ is applied to the collector of a pair of driver transistors at pins 8 and 11 via a current limiting resistor 47, the driver transistors providing drive current to the NPN transistor 26. The frequency of the pulse width modulator 23 is established by a timing resistor 48 and a timing capacitor 50 coupled to the pins 5 and 6. The pulse width modulator 23 includes an internal voltage reference generator supplying the reference voltage $V_{ref}$ at output pin 14. This voltage is applied to the negative input of an internal error amplifier at pin 2 via a resistor 59. The sense voltage $V_{sen}$ is supplied to the positive input of the error amplifier at pin 1. The difference between the reference voltage and the sense voltage establishes the pulse width of the output signal at pins 9 and 10 and at a frequency established by the timing elements 48 and 50.

The low frequency gain of the pulse width modulator 23 is established by a feedback resistor 60 coupled between pins 2 and 3. The gain of the pulse width modulator 23 is decreased at high frequencies by a feedback capacitor 62 and a feedback resistor 64 coupled between the pins 2 and 3.

With these elements described, the circuit 23 operates to maintain the voltage $V_{reg}$ at the output terminal 19 at the desired regulated voltage for all values of the unregulated input voltage $V_{in}$ as previously described with reference to FIG. 1.

The pulse width modulator 23 also contains a dead time control input at pin 4 that establishes minimum dead time values between the pulses supplied at output pins 9 and 10. The dead time imposed increases with increasing voltages at the pin 4 thereby decreasing the maximum pulse widths permitted at the output pins 9 and 10. A pair of resistors 66 and 68 coupled between pin 14 and ground establishes a nominal dead time value to limit the output pulse width at pins 9 and 10 to some value representing, for example, 50% duty cycle in the output signal. However, to provide for load dump protection, a zener diode 70 and a resistor 72 are series coupled between the unregulated voltage source at input terminal 17 and ground so that a voltage is generated across the resistor 72 when the unregulated source voltage $V_{in}$ exceeds the breakdown voltage of the zener diode 70. This voltage is applied to the dead time input pin 4 via a diode 74 to increase the minimum imposed dead time thereby limiting the pulse width output of the pulse width modulator 23 to a low value to lower the intermediate voltage applied to the transistor 22. A capacitor 75 is coupled in parallel with the resistor 68 so that when the source voltage $V_{in}$ is first applied to terminal 17, the full value of the reference voltage at pin 14 is applied to the pin 4. This voltage sets the minimum dead time to a high value to prevent an initial high voltage surge in response to the initially sensed low voltage at the output terminal 19. The imposed minimum dead time is then decreased to the nominal dead time value established by the resistors 66 and 68 as the capacitor 75 is charged.

To provide for current limiting, a series circuit comprised of a resistor 76, a resistor 78 and a diode 80 senses the differential voltage between the input terminal 17 and the output regulated voltage terminal 19. The sensed voltage between the resistors 76 and 78 is applied to a negative input of a differential comparator in the pulse width modulator 23 at pin 15. The reference voltage at pin 14 is applied to the positive input of the pulse width modulator 23 at pin 16 through a resistor 82. The voltage at pin 16 is developed across a capacitor 84. If a short circuit condition should occur at output terminal 19, the voltage sensed by the resistors 76 and 78 decreases to apply a voltage at pin 15 less than the reference voltage applied at pin 16 to force the pulse width output of the pulse width modulator to the minimum value to thereby reduce the intermediate voltage applied to the emitter of the series pass transistor 22, which is biased nonconductive. A diode 86 is provided to provide for a quick discharge of the capacitor 84 when the integrated circuit 23 is deenergized.

A filter capacitor 90 is coupled between the input voltage terminal 17 and ground and filtering capacitors 92 and 94 are provided at the anode of the diode 40 to filter the noise signals generated by the up regulator 21.

The foregoing description of a preferred embodiment for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A voltage regulator for applying a desired regulated voltage across a load terminal and a reference terminal from a voltage source having a source voltage varying above and below the desired regulated voltage, the voltage regulator comprising, in combination:

a PNP transistor having a collector electrode coupled to the load terminal, a base electrode coupled to receive the source voltage and an emitter electrode;

means effective to sense the actual voltage across the load and reference terminals; and a voltage multiplier coupled to the source voltage effective to supply an intermediate voltage to the emitter electrode of the PNP transistor that is greater than the source voltage by an amount that is a direct function of the amount the sensed actual voltage is below the desired regulated voltage, the PNP transistor being (A) biased into saturation by the source and intermediate voltages when the source voltage is less than the desired regulated voltage so that the regulated voltage is substantially equal to the intermediate voltage and (B) variably biased by the source and intermediate voltages to variably attenuate the intermediate voltage when the source voltage is greater than the desired regulated voltage so that the regulated voltage is equal to the intermediate voltage minus the voltage drop across the emitter and collector electrodes of the PNP transistor, whereby the voltage multiplier and the PNP transistor function as an up regulator when the source voltage is less than the desired regulated voltage and function as a dissipative down regulator when the source voltage is greater than the desired regulated voltage so as to maintain the desired regulated voltage for all values of the source voltage.

2. A voltage regulator for applying a desired regulated voltage across a load terminal and a reference terminal from a voltage source having a source voltage varying above and below the desired regulated voltage, the voltage regulator comprising, in combination:

a PNP transistor having a collector electrode coupled to the load terminal, a base electrode coupled to receive the source voltage and an emitter electrode;

means effective to sense the voltage across the load and reference terminals;

means effective to provide a reference voltage representing a desired regulated voltage across the load and reference terminals; and a switching regulator coupled to the source voltage and being responsive to the difference between the sensed voltage and the reference voltage effective to supply an intermediate voltage to the emitter electrode of the PNP transistor that is greater than the source voltage by an amount that the reference voltage is greater than the sensed voltage, the PNP transistor being (A) biased into saturation by the source and intermediate voltages when the source voltage is less than the desired regulated voltage so that the regulated voltage is substantially equal to the intermediate voltage and (b) variably biased by the source and intermediate voltages to variably attenuate the intermediate voltage when the source voltage is greater than the desired regulated voltage so that the regulated voltage is equal to the intermediate voltage minus the voltage drop across the emitter and collector electrodes of the PNP transistor, whereby the switching regulator and the PNP transistor function as an up regulator when the source voltage is less than the desired regulated voltage and function as a dissipative down regulator when the source voltage is greater than the desired regulated voltage so as to maintain the desired regulated voltage for all values of the source voltage.

3. The voltage regulator of claim 2 wherein the switching regulator includes an inductor, a pulse width modulator effective to repetitively couple the inductor in parallel with the voltage source to be charged thereby for periods directly proportional to the amount the reference voltage is greater than the sensed voltage, a capacitor coupled to the inductor to be charged thereby to a value directly proportional to the amount of the inductor charge, and a filter effective to filter the voltage across the capacitor, the filtered voltage comprising the intermediate voltage.

* * * * *